(12) United States Patent
Zhang et al.

(10) Patent No.: US 8,966,779 B2
(45) Date of Patent: Mar. 3, 2015

(54) AMBIDEXTROUS VERNIER CALIPER

(71) Applicant: Tec One International Co., Ltd., Taichung (TW)

(72) Inventors: Heng-Xiang Zhang, Taitung (TW); Ke-Qian Wu, Taitung (TW); Zhe-Yan Pan, Taitung (TW)

(73) Assignee: Tec One International Co., Ltd., Taichung (TW)

( * ) Notice: Subject to any disclaimer, the term of this patent is extended or adjusted under 35 U.S.C. 154(b) by 178 days.

(21) Appl. No.: 13/781,272

(22) Filed: Feb. 28, 2013

(65) Prior Publication Data

US 2013/0227854 A1     Sep. 5, 2013

(30) Foreign Application Priority Data

Mar. 1, 2012   (TW) .............................. 101203617 U

(51) Int. Cl.
*G01B 3/20*     (2006.01)
*G01B 3/00*     (2006.01)

(52) U.S. Cl.
CPC . *G01B 3/20* (2013.01); *G01B 3/002* (2013.01)

USPC .............................................. 33/809; 33/784

(58) Field of Classification Search
USPC ........................... 33/809, 783, 784, 813, 819
See application file for complete search history.

(56) References Cited

U.S. PATENT DOCUMENTS

| 5,901,458 | A | * | 5/1999 | Andermo et al. | ............... 33/810 |
| 6,834,439 | B2 | * | 12/2004 | Matsumiya et al. | ............ 33/784 |
| 7,231,726 | B2 | * | 6/2007 | Matsumiya et al. | ............ 33/783 |
| 7,373,735 | B2 | * | 5/2008 | Jacobs | ............................. 33/784 |
| 7,721,455 | B2 | * | 5/2010 | Matsumiya et al. | ............ 33/783 |
| 2003/0047009 | A1 | * | 3/2003 | Webb | ............................ 33/501.02 |
| 2005/0235517 | A1 | * | 10/2005 | John et al. | ........................ 33/784 |
| 2013/0152398 | A1 | * | 6/2013 | Wagstaff et al. | ................ 33/836 |
| 2013/0227854 | A1 | * | 9/2013 | Zhang et al. | .................... 33/809 |

* cited by examiner

*Primary Examiner* — Yaritza Guadalupe-McCall
(74) *Attorney, Agent, or Firm* — Muncy, Geissler, Olds & Lowe, P.C.

(57) ABSTRACT

An ambidextrous vernier caliper includes a main ruler and a vernier having a slide channel in which the main ruler is inserted. As each of the front and back sides of the main ruler has a graduated layer, and each of the front and back sides of the vernier has a scaled layer, the vernier caliper is convenient to use by left-handed as well as right-handed people.

4 Claims, 7 Drawing Sheets

AMBIDEXTROUS VERNIER CALIPER

BACKGROUND OF THE INVENTION

1. Technical Field

The present invention relates to a vernier caliper and, more particularly, to a vernier caliper for both right-handed and left-handed use.

2. Description of Related Art

Please refer to FIG. 5 to FIG. 7 for an existing vernier caliper which includes a main ruler 30 and a vernier 40. As shown in FIG. 5, the left end of the main ruler 30 is formed with a downwardly extending first jaw 31, and the front side of the main ruler 30 is formed with length markings 32. The vernier 40 is formed with a slide channel 43 which extends through the left and right ends of the vernier 40 and in which the main ruler 30 is inserted. Referring to FIG. 5, the left lower end of the vernier 40 is formed with a second jaw 41 corresponding to the first jaw 31, and the front side of the vernier 40 is formed with measurement markings 42 corresponding to the length markings 32.

Referring again to FIG. 5, as the first and second jaws 31, 41 of the vernier caliper are respectively formed at the left ends of the main ruler 30 and the vernier 40, and the length markings 32 and the measurement markings 42 are respectively formed on the front sides of the main ruler 30 and the vernier 40, the right hand of a right-handed user is unlikely to interfere with the object being clamped, and thereby measured, between the first and second jaws 31, 41. However, the left hand of a left-handed user, who must also read the length markings 32 and the measurement markings 42 on the front sides of the main ruler 30 and the vernier 40, is bound to interfere with the object being measured, which causes great inconvenience in use. Such an inconvenient design must be improved.

BRIEF SUMMARY OF THE INVENTION

In view of the inconvenience caused by the aforesaid existing vernier caliper to a left-handed user, the primary object of the present invention is to provide a vernier caliper suitable for use by both the right-handed and the left-handed.

The major technical means to achieving the foregoing object consists in an ambidextrous vernier caliper which includes: a main ruler whose one end is laterally extended with a first jaw and whose front and back sides are respectively formed with a first graduated layer and a second graduated layer, wherein the markings on the second graduated layer are in an order reverse to that of the markings on the first graduated layer; and a vernier having a slide channel extending through two opposite ends of the vernier so as for the main ruler to be inserted in the slide channel, wherein the vernier has one end laterally extended with a second jaw corresponding to the first jaw and has front and back sides respectively formed with a first scaled layer and a second scaled layer, the markings on the second scaled layer being in an order reverse to that of the markings on the first scaled layer.

The vernier caliper of the present invention has a graduated layer and a scaled layer on each of its front and back sides and is therefore convenient for both right-handed and left-handed use.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
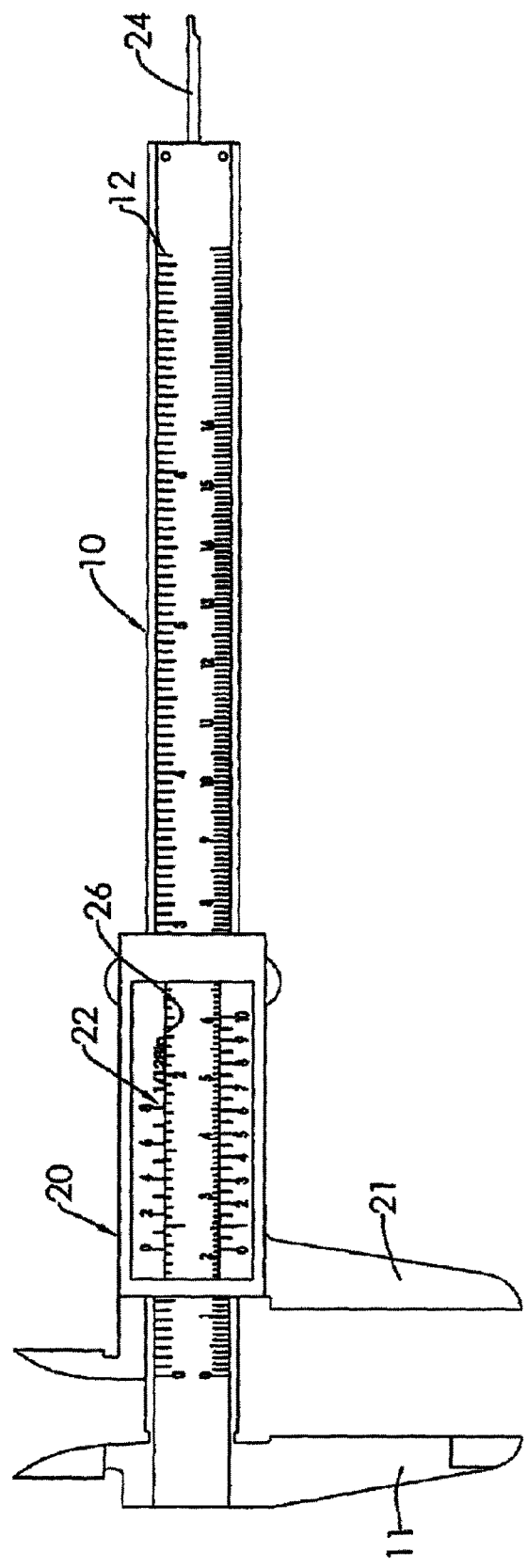
FIG. 1 is a front view of the ambidextrous vernier caliper.
Figure 2:
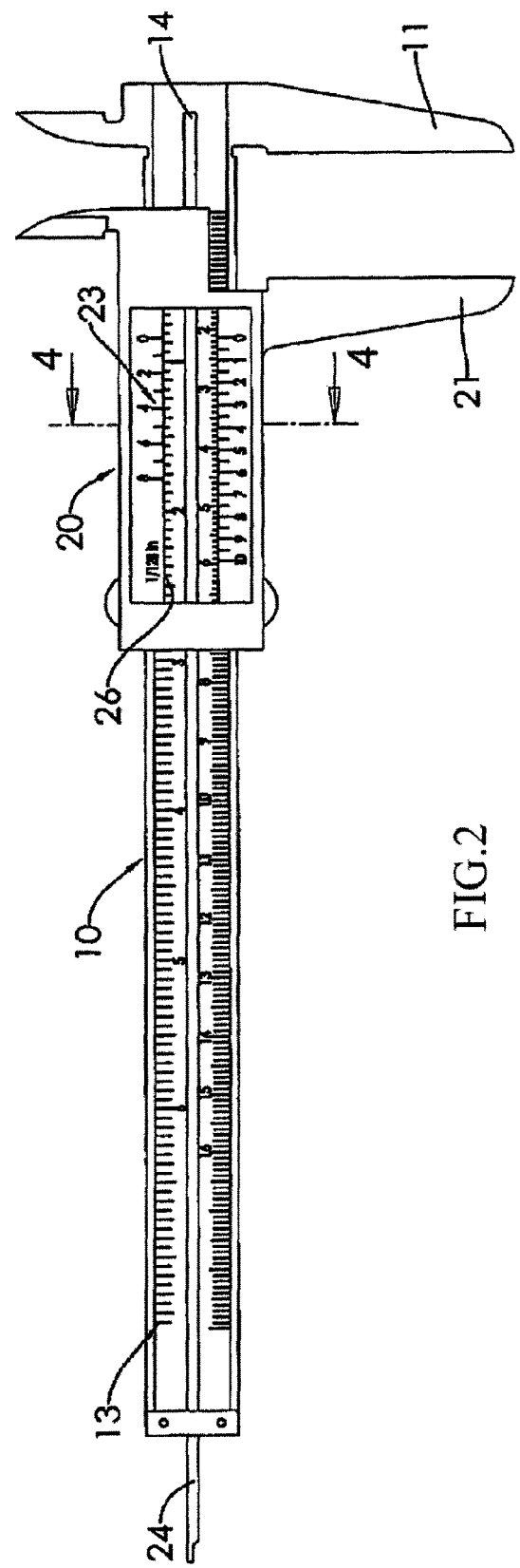
FIG. 2 is a rear view of the ambidextrous vernier caliper.
Figure 3:
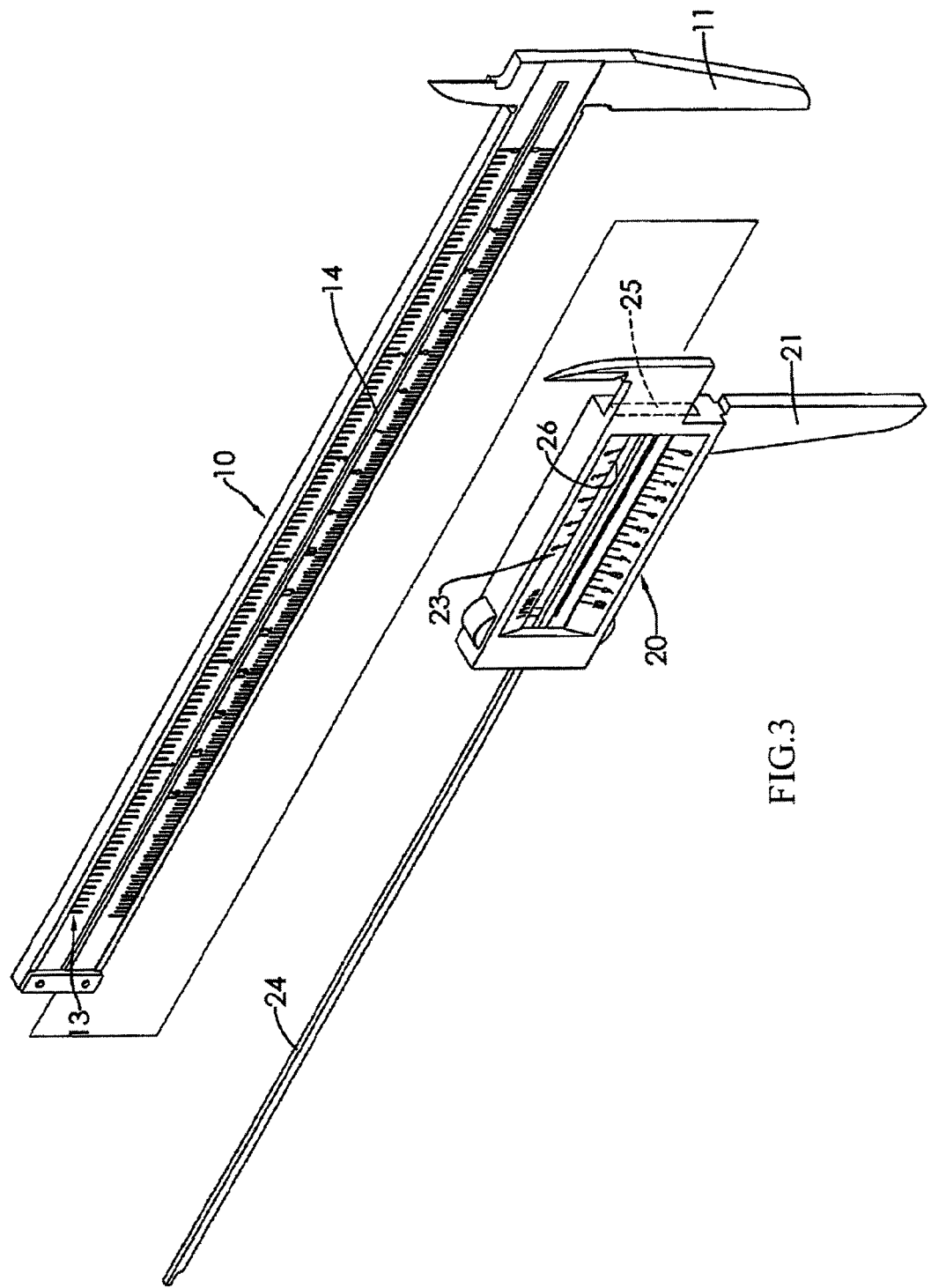
FIG. 3 is an exploded perspective view of an ambidextrous vernier caliper according to the present invention.

Referring to FIG. 1 to FIG. 3, an ambidextrous vernier caliper includes a main ruler 10 and a vernier 20. One end of the main ruler 10 is laterally extended with a first jaw 11. The front side of the main ruler 10 is formed with a first graduated layer 12, and the back side of the main ruler 10 is formed with a second graduated layer 13. The markings on the second graduated layer 13 are in an order reverse to the order of the markings on the first graduated layer 12. More specifically, the markings on the first graduated layer 12 are arranged in an ascending order from the end of the main ruler 10 that is formed with the first jaw 11 toward the opposite end, i.e., from left to right as shown in FIG. 1, whereas the markings on the second graduated layer 13 are arranged in a descending order when read from left to right, as shown in FIG. 2. In this embodiment, the back side of the main ruler 10 is further formed with a linear groove 14 which extends to the end of the main ruler 10 that is opposite to the end where the first jaw 11 is formed. The vernier 20 is formed with a slide channel 25 which extends through two opposite ends of the vernier 20 and in which the main ruler 10 is inserted. One end of the vernier 20 is laterally extended with a second jaw 21 which corresponds to the first jaw 11. The front side of the vernier 20 is formed with a first scaled layer 22, and the back side of the vernier 20 is formed with a second scaled layer 23. The markings on the second scaled layer 23 are in an order reverse to the order of the markings on the first scaled layer 22. In this embodiment, the vernier 20 is formed with a linear block 24 which is located in the slide channel 25 and which corresponds to and is slidably provided in the linear groove 14. The linear block 24 protrudes out of the slide channel 25 in a direction outward of the opposite end of the vernier 20 (i.e., the end opposite to the end where the second jaw 21 is formed). The vernier 20 is also formed with an observation hole 26 which extends through the front and back sides of the vernier 20. The markings on the first scaled layer 22 correspond in order to the markings on the first graduated layer 12 of the main ruler 10. More specifically, the markings on the first scaled layer 22 are also arranged in an ascending order when read from left to right, i.e., from the end of the vernier 20 that is formed with the second jaw 21 toward the opposite end, as shown in FIG. 1. The markings on the second scaled layer 23, however, are arranged in a descending order when read from left to right, as shown in FIG. 2.

Figure 4:
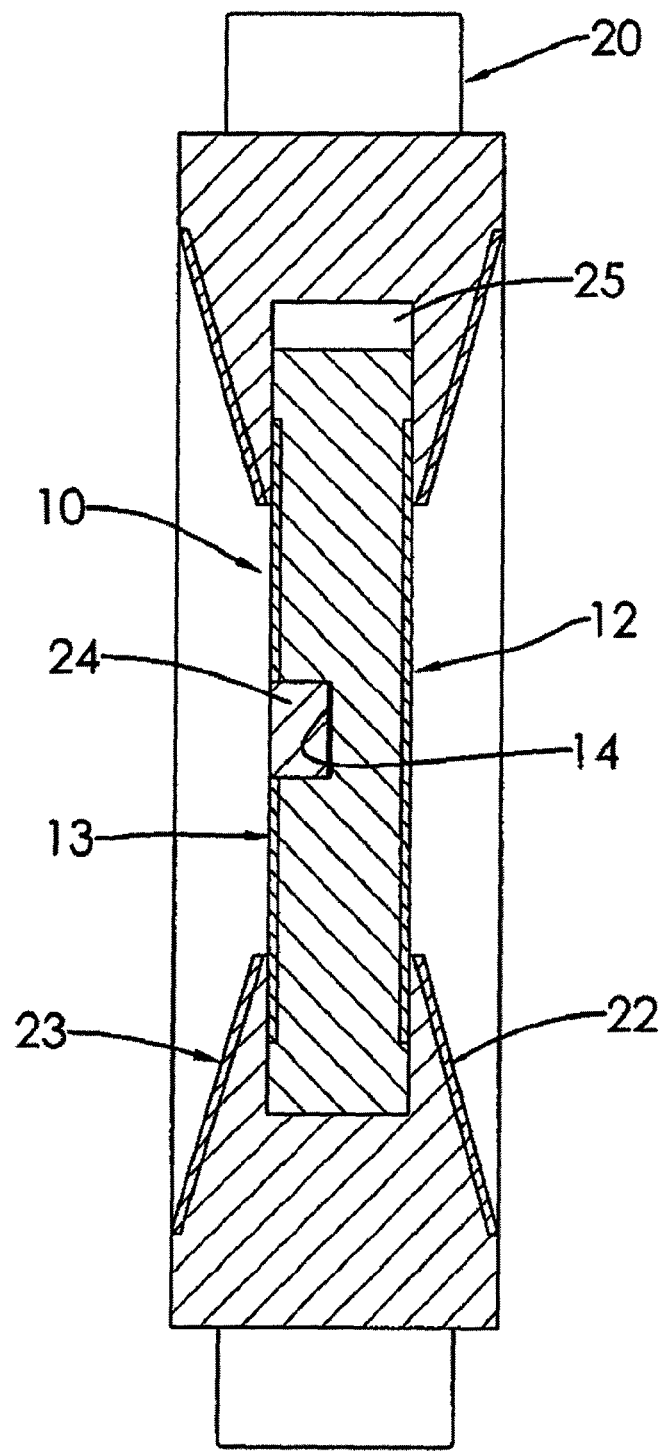
FIG. 4 is a sectional view of the ambidextrous vernier caliper shown in FIG. 1.
Figure 5:
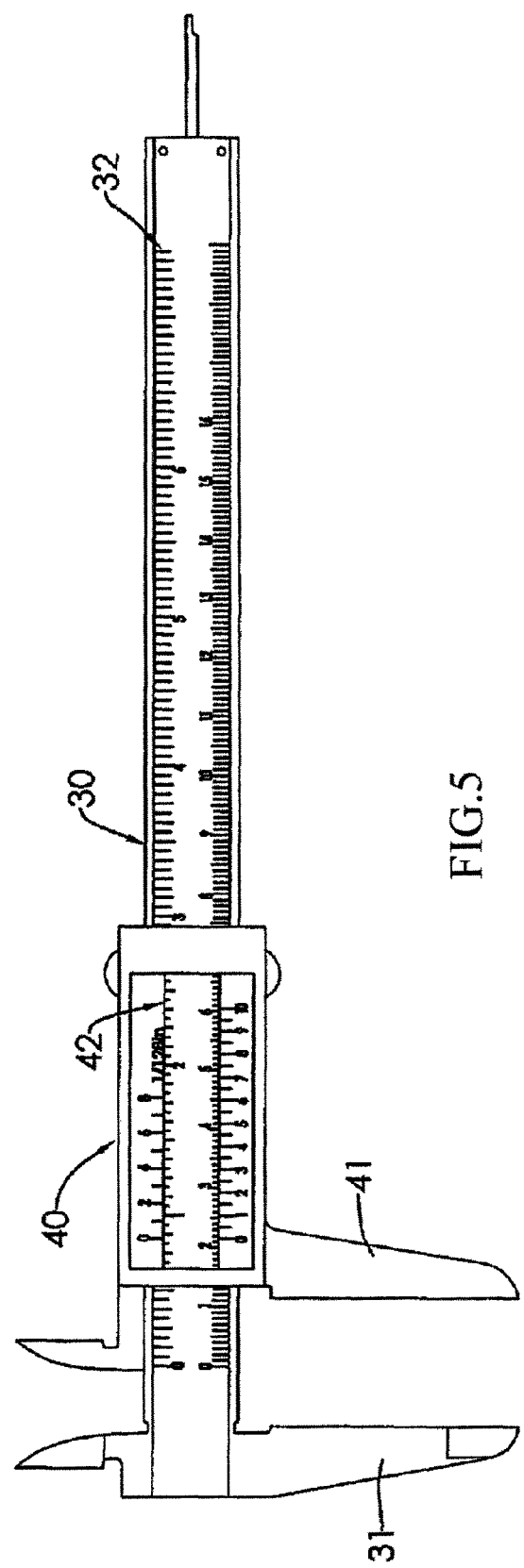
FIG. 5 is a front view of an existing vernier caliper.
Figure 6:
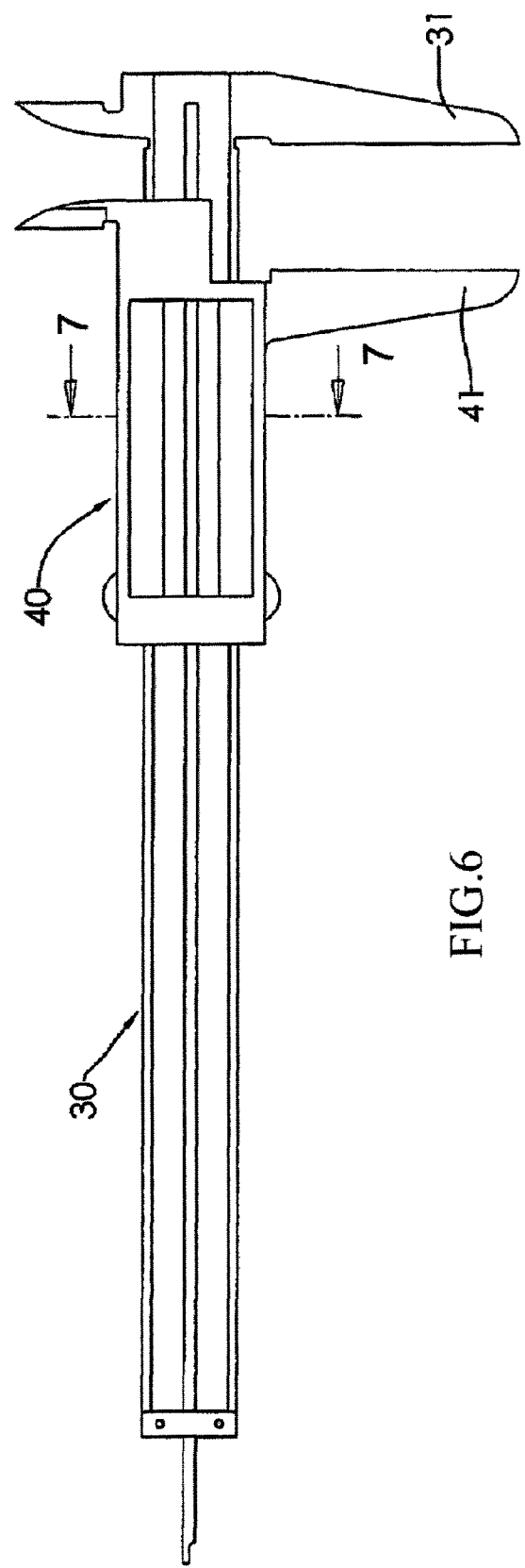
FIG. 6 is a rear view of the existing vernier caliper shown in FIG. 5.
Figure 7:
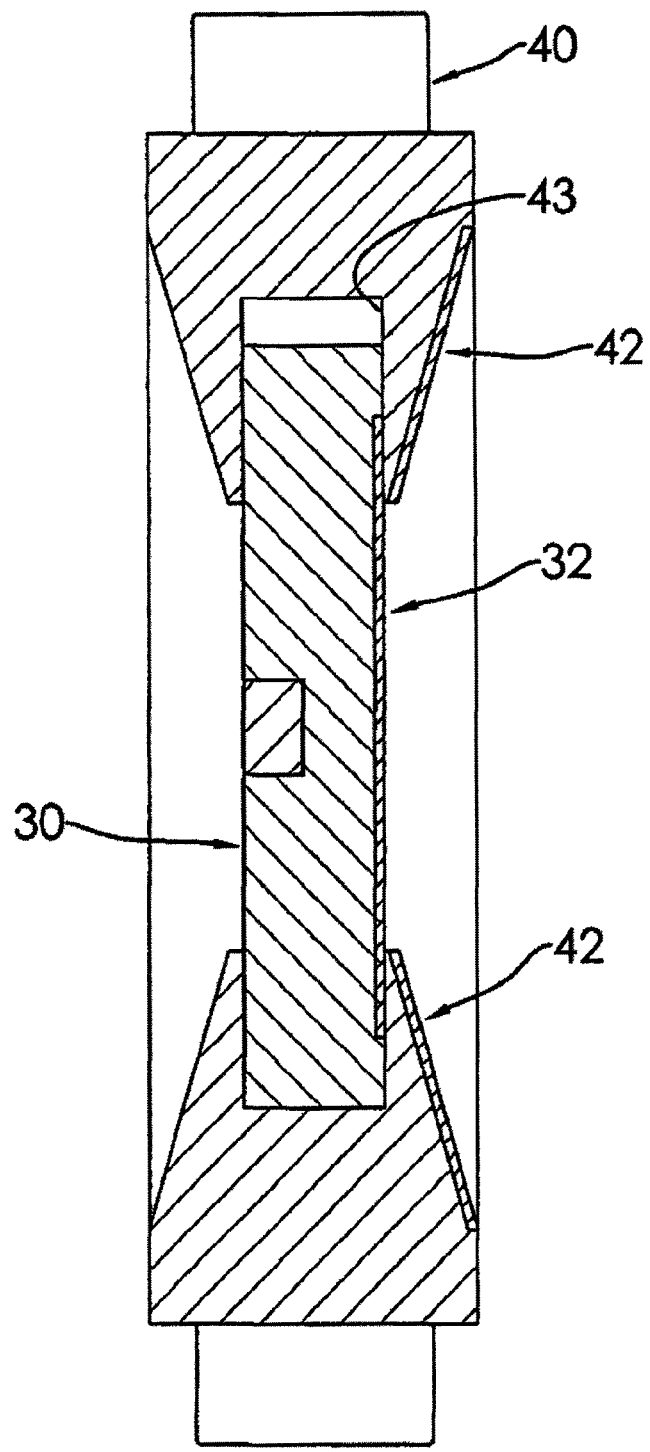
FIG. 7 is a sectional view of the existing vernier caliper shown in FIG. 5.

Referring to FIG. 4, as the main ruler 10 is inserted in the slide channel 25 of the vernier 20, with the linear groove 14 engaged with the linear block 24, the main ruler 10 can slide linearly with respect to the vernier 20. In use, a user may read the markings on either of the scaled layers 22 and 23 while reading the markings on the corresponding graduated layer 12 or 13 through the observation hole 26. Hence, precise measurement can be achieved with the markings on either side of the vernier caliper.

In conclusion, as the vernier caliper of the present invention has a graduated layer and a scaled layer on each of its front and back sides, a user, regardless of his or her handedness, can read the length markings and measurement markings on either side and operate the vernier caliper without difficulty.

What is claimed is:

1. An ambidextrous vernier caliper, comprising:
   a main ruler having an end laterally extended with a first jaw, the main ruler having a front side formed with a first graduated layer and a back side formed with a second graduated layer, wherein markings on the second graduated layer are in an order verse to an order of markings on the first graduated layer; and
   a vernier formed with a slide channel extending through two opposite ends of the vernier, the main ruler being inserted in the slide channel, the vernier having an end laterally extended with a second jaw corresponding to the first jaw, the vernier having a front side formed with a first scaled layer and a back side formed with a second scaled layer, wherein markings on the second scaled layer are in an order reverse to an order of markings on the first scaled layer.

2. The ambidextrous vernier caliper of claim 1, wherein the back side of the main ruler is formed with a linear groove extending to an end of the main ruler that is opposite to the end where the first jaw is formed, and the vernier is formed with a linear block which is located in the slide channel and which corresponds to and is slidably provided in the linear groove.

3. The ambidextrous vernier caliper of claim 2, wherein the linear block protrudes out of the slide channel and extends in a direction outward of an end of the vernier that is opposite to the end where the second jaw is formed.

4. The ambidextrous vernier caliper of claim 1, wherein the vernier is formed with an observation hole extending through the front side and the back side of the vernier.

* * * * *